(12) United States Patent
Albrecht et al.

(10) Patent No.: US 7,852,587 B2
(45) Date of Patent: **\*Dec. 14, 2010**

(54) THERMAL ASSISTED RECORDING (TAR) DISK DRIVE CAPABLE OF CONTROLLING THE WRITE PULSES

(75) Inventors: Thomas R Albrecht, San Jose, CA (US); Manfred Ernst Schabes, Saratoga, CA (US); Barry Cushing Stipe, San Jose, CA (US); Gabriel Zeltzer, Redwood City, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 197 days.

This patent is subject to a terminal disclaimer.

(21) Appl. No.: 12/209,089

(22) Filed: Sep. 11, 2008

(65) Prior Publication Data

US 2010/0061018 A1    Mar. 11, 2010

(51) Int. Cl.
*G11B 5/02* (2006.01)
(52) U.S. Cl. .................. 360/59; 360/51; 369/13.33; 369/13.13
(58) Field of Classification Search .................. 360/59, 360/51, 31, 48; 369/13.33, 13.13, 13.32, 369/112.09, 112.24, 112.21, 112.27; 385/146, 385/39, 50, 36
See application file for complete search history.

(56) References Cited

U.S. PATENT DOCUMENTS 5,583,727 A    12/1996    Parkin (Continued)

FOREIGN PATENT DOCUMENTS

JP    6208763    7/1994

(Continued)

OTHER PUBLICATIONS

White et al., "Patterned Media: A Viable Route to 50 Gbit/in2 and Up for Magnetic Recording?", IEEE Transactions on Magnetics, vol. 33, No. 1, Jan. 1997, pp. 990-995.

(Continued)

*Primary Examiner*—Tan X Dinh
(74) *Attorney, Agent, or Firm*—Thomas R. Berthold

(57) ABSTRACT

A patterned-media magnetic recording disk drive uses an optical system for accurately clocking the write data. The disk has concentric data tracks patterned into discrete magnetizable data islands with nonmagnetic spaces between the islands. As the disk rotates, a radiation source directs near-field radiation to the islands and spaces, and a radiation detector receives reflected radiation. The radiation is directed from the source through an optical channel or waveguide on the air-bearing slider that supports the read and write heads. The optical channel or waveguide has a near-field transducer at the disk-facing surface of the slider where the near-field radiation exits and reflected radiation returns. The reflected optical power varies depending on whether the near-field transducer couples to an island or a space, so the radiation detector output signal represents the frequency and phase of the islands as the disk rotates. The write clock that controls write pulses to the write head is responsive to the radiation detector output signal, so the frequency and phase of the write clock signal can be matched to the frequency and phase of the islands as the disk rotates.

20 Claims, 7 Drawing Sheets

U.S. PATENT DOCUMENTS

| | | | |
|---|---|---|---|
| 5,615,192 A * | 3/1997 | Kikukawa et al. | 369/47.17 |
| 5,820,769 A | 10/1998 | Chou | |
| 6,680,079 B1 | 1/2004 | Stirniman et al. | |
| 6,754,017 B2 | 6/2004 | Rettner et al. | |
| 6,947,235 B2 * | 9/2005 | Albrecht et al. | 360/55 |
| 6,975,580 B2 | 12/2005 | Rettner et al. | |
| 6,982,844 B2 | 1/2006 | Rettner et al. | |
| 7,324,294 B2 * | 1/2008 | Moser | 360/51 |
| 7,609,469 B2 * | 10/2009 | Gage et al. | 360/51 |
| 7,670,696 B2 * | 3/2010 | Fullerton et al. | 428/834 |
| 7,675,699 B2 * | 3/2010 | Albrecht | 360/48 |
| 7,675,703 B2 * | 3/2010 | Albrecht et al. | 360/51 |
| 2006/0187564 A1 * | 8/2006 | Sato et al. | 360/59 |
| 2008/0068748 A1 * | 3/2008 | Olson et al. | 360/110 |
| 2009/0258186 A1 * | 10/2009 | Fontana et al. | 428/131 |
| 2010/0091618 A1 * | 4/2010 | Schabes et al. | 369/13.02 |

FOREIGN PATENT DOCUMENTS

JP  20000048303  2/2002

OTHER PUBLICATIONS

Moritz et al., "Patterned Media Made From Pre-Etched Wafers: A Promising Route Toward Ultrahigh-Density Magnetic Recording", IEEE Transactions on Magnetics, vol. 38, No. 4, Jul. 2002, pp. 1731-1736.

Bandic et al., "Patterned magnetic media: impact of nanoscale patterning on hard disk drives", Solid State Technology S7+Suppl. S, Sep. 2006.

Matteo et al., Applied Physics Letters, vol. 85(4), pp. 648-650 (2004).

Thio et al., "Enhanced light transmission through a single subwavelength aperture", Optics Letters, vol. 26, Issue 24, pp. 1972-1974 (2001).

"Thermomagnetic Writing/Magnetoresistive Reading On Ferromagnetic Disk", IBM Technical Disclosure Bulletin, Jul. 1991, pp. 481-482.

* cited by examiner

THERMAL ASSISTED RECORDING (TAR) DISK DRIVE CAPABLE OF CONTROLLING THE WRITE PULSES

BACKGROUND OF THE INVENTION

1. Field of the Invention

This invention relates generally to magnetic recording disk drives for use with patterned media, wherein each data bit is stored in a magnetically isolated island or island on the disk, and more particularly to such a disk drive with an improved clock for writing the data.

2. Description of the Related Art

Magnetic recording hard disk drives with patterned magnetic recording media have been proposed to increase the data density. In patterned media, the magnetic material on the disk is patterned into small isolated data islands or islands arranged in concentric data tracks. Each island contains a single magnetic "bit" and is separated from neighboring islands by a nonmagnetic region. This is in contrast to conventional continuous media wherein a single "bit" is composed of multiple weakly-coupled neighboring magnetic grains that form a single magnetic domain and the bits are physically adjacent to one another. Patterned-media disks may be longitudinal magnetic recording disks, wherein the magnetization directions are parallel to or in the plane of the recording layer, or perpendicular magnetic recording disks, wherein the magnetization directions are perpendicular to or out-of-the-plane of the recording layer. To produce the required magnetic isolation of the patterned islands, the magnetic moment of the regions between the islands must be destroyed or substantially reduced so as to render these regions essentially nonmagnetic. Alternatively, the media may be fabricated so that that there is no magnetic material in the regions between the islands. U.S. Pat. No. 5,820,769 is representative of various types of patterned media and their methods of fabrication. A description of magnetic recording systems with patterned media and their associated challenges is presented by R. L. White et al., "Patterned Media: A Viable Route to 50 Gbit/in$^2$ and Up for Magnetic Recording?", *IEEE Transactions on Magnetics*, Vol. 33, No. 1, January 1997, pp. 990-995.

In one type of patterned media, the data islands are elevated, spaced-apart pillars that extend above the disk substrate surface to define troughs or trenches on the substrate surface between the pillars. This type of patterned media is of interest because substrates with the pre-etched pattern of pillars and trenches can be produced with relatively low-cost, high volume processes such as lithography and nanoimprinting. The magnetic recording layer material is then deposited over the entire surface of the pre-etched substrate to cover both the ends of the pillars and the trenches. The trenches are recessed far enough from the read/write head to not adversely affect reading or writing. This type of patterned media is described by Moritz et al., "Patterned Media Made From Pre-Etched Wafers: A Promising Route Toward Ultrahigh-Density Magnetic Recording", *IEEE Transactions on Magnetics*, Vol. 38, No. 4, July 2002, pp. 1731-1736.

In conventional magnetic recording where the data bits are written on continuous media, there is no requirement to write to precise positions on the media since all of the media contains magnetic material. However, with patterned media, because the data islands are single-domain, the transitions between bits may occur only between islands. Since the magnetic transitions are restricted to predetermined locations governed by the locations of individual islands, it is necessary to synchronize the reversal of current in the write head with the passing of individual islands under the head. Also to assure that the write head is precisely aligned with the islands on the patterned media, the media must be patterned perfectly with a single accurate period, and the effective motor speed of the spindle supporting the disks must be highly stable so that the write clock is perfectly synchronized with the islands as they pass beneath the write head. U.S. Pat. No. 6,754,017 B2, assigned to the same assignee as this application, describes a magnetic recording disk drive with patterned media that uses a special pattern-sensor that senses the data islands before they pass beneath the write head and generates a write-clock signal.

What is needed is a magnetic recording disk drive with patterned media that has a method for detecting the data islands to generate an accurate write-clock signal so that the data can be accurately written to the patterned data islands.

SUMMARY OF THE INVENTION

The invention relates to a patterned-media magnetic recording disk drive with a system and method for accurately clocking the write data. The disk has concentric data tracks patterned into discrete magnetizable data islands with nonmagnetic spaces between the islands. Radiation from a radiation source is directed from the source through an optical waveguide on the head carrier or air-bearing slider that supports the read and write heads. The optical waveguide has a near-field transducer at the disk-facing surface of the slider where the radiation exits and reflected radiation returns. As the disk rotates, the radiation source directs radiation to the near-field transducer, and a radiation detector receives reflected radiation from the near-field transducer. The reflected optical power varies depending on whether an island or space is under the transducer and receives near-field radiation from the transducer, so the radiation detector output signal represents the frequency and phase of the islands as the disk rotates. The write clock signal that controls write pulses to the write head is responsive to the radiation detector output signal, so the frequency and phase of the write clock signal can be matched to the frequency and phase of the islands as the disk rotates. Control circuitry includes a phase-locked-loop (PLL) that receives an analog voltage signal from the radiation detector and provides a write clock signal that is adjusted to the frequency and phase of the islands. A phase shift may be applied to the write clock signal to adjust for the physical spacing along-the-track between the write head and the near-field transducer.

For a fuller understanding of the nature and advantages of the present invention, reference should be made to the following detailed description taken together with the accompanying figures.

DETAILED DESCRIPTION OF THE INVENTION

Figure 1:
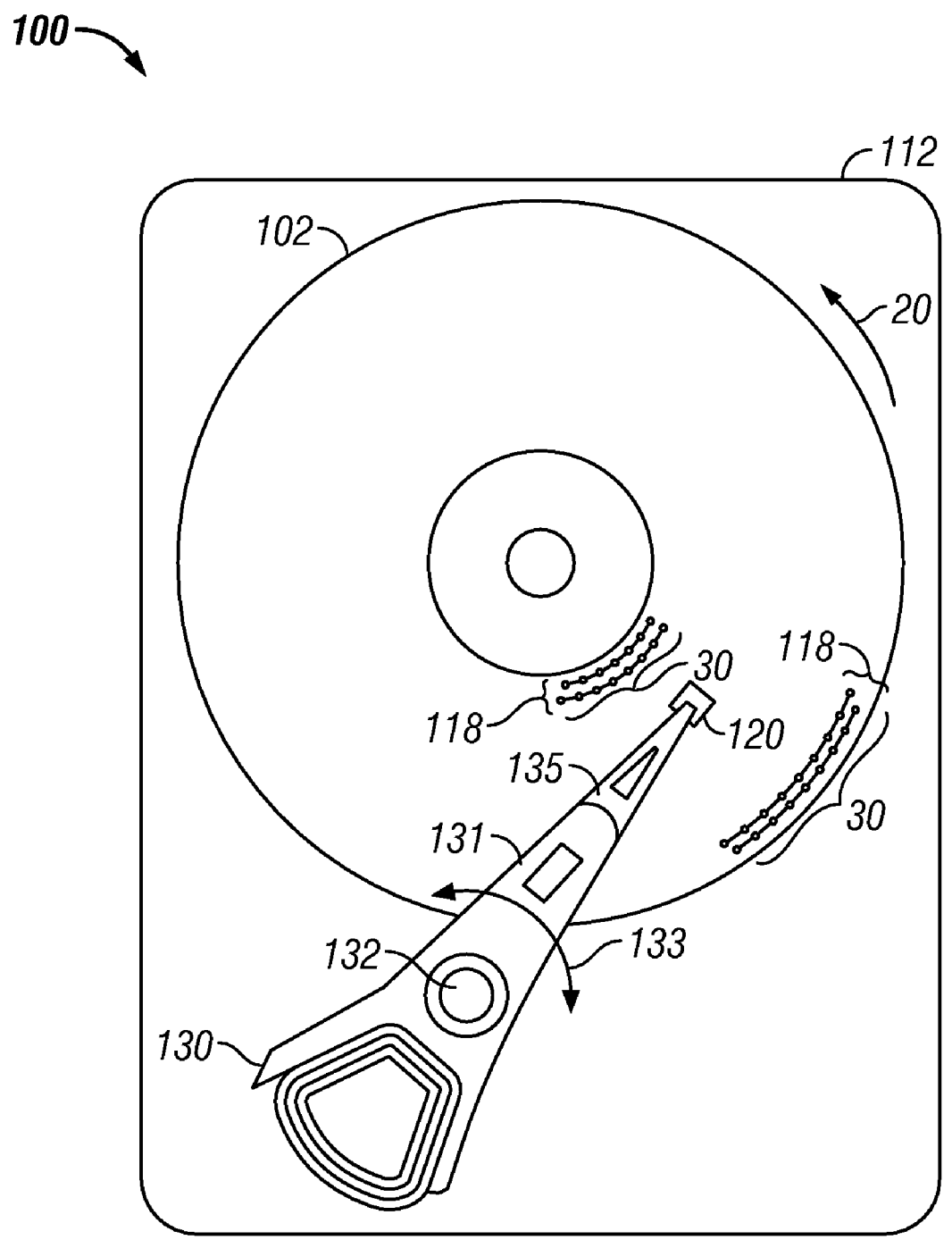
FIG. 1 is a top view of a patterned-media magnetic recording disk drive with a patterned-media magnetic recording disk.

FIG. 1 is a top view of a patterned-media magnetic recording disk drive 100 with a patterned-media magnetic recording disk 102. The drive 100 has a housing or base 112 that supports an actuator 130 and a drive motor for rotating the magnetic recording disk 102. The actuator 130 may be a voice coil motor (VCM) rotary actuator that has a rigid arm 131 and rotates about pivot 132 as shown by arrow 133. A head-suspension assembly includes a suspension 135 that has one end attached to the end of actuator arm 131 and a head carrier, such as an air-bearing slider 120, attached to the other end of suspension 135. The suspension 135 permits the slider 120 to be maintained very close to the surface of disk 102 and enables it to "pitch" and "roll" on the air-bearing generated by the disk 102 as it rotates in the direction of arrow 20. A magnetoresistive read head (not shown) and an inductive write head (not shown) are typically formed as an integrated read/write head patterned as a series of thin films and structures on the trailing end of the slider 120, as is well known in the art. The slider 120 is typically formed of a composite material, such as a composite of alumina/titanium-carbide ($Al_2O_3/TiC$). Only one disk surface with associated slider and read/write head is shown in FIG. 1, but there are typically multiple disks stacked on a hub that is rotated by a spindle motor, with a separate slider and read/write head associated with each surface of each disk.

The patterned-media magnetic recording disk 102 includes a disk substrate and discrete data islands 30 of magnetizable material on the substrate. The data islands 30 are arranged in radially-spaced circular tracks 118, with only a few islands 30 and representative tracks 118 near the inner and outer diameters of disk 102 being shown in FIG. 1. As the disk 102 rotates in the direction of arrow 20, the movement of actuator 130 allows the read/write head on the trailing end of slider 120 to access different data tracks 118 on disk 102.

Figure 2:
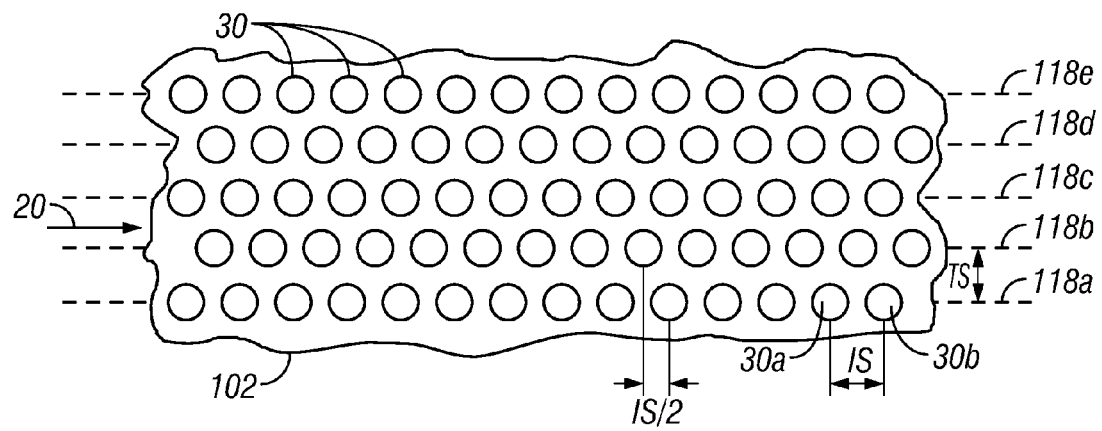
FIG. 2 is a top view of an enlarged portion of a patterned-media disk showing the detailed arrangement of the data islands.

FIG. 2 is a top view of an enlarged portion of disk 102 showing the detailed arrangement of the data islands 30 on the surface of the disk substrate in one type of pattern according to the prior art. The islands 30 contain magnetizable recording material and are arranged in circular tracks spaced-apart in the radial or cross-track direction, as shown by tracks 118a-118e. The tracks are typically equally spaced apart by a fixed track spacing TS. The spacing between data islands in a track is shown by distance IS between data islands 30a and 30b in track 118a, with adjacent tracks being shifted from one another by a distance IS/2, as shown by tracks 118a and 118b.

Patterned-media disks like that shown in FIG. 2 may be longitudinal magnetic recording disks, wherein the magnetization directions in the magnetizable recording material in islands 30 are parallel to or in-the-plane of the recording layer in the islands, or perpendicular magnetic recording disks, wherein the magnetization directions are perpendicular to or out-of-the-plane of the recording layer in the islands. To produce the required magnetic isolation of the patterned data islands 30, the magnetic moment of the regions or spaces between the islands 30 must be destroyed or substantially reduced to render these spaces essentially nonmagnetic. The term "nonmagnetic" means that the spaces between the islands 30 are formed of a nonferromagnetic material, such as a dielectric, or a material that has no substantial remanent moment in the absence of an applied magnetic field, or a magnetic material in a trench recessed far enough below the islands 30 to not adversely affect reading or writing. The nonmagnetic spaces may also be the absence of magnetic material, such as trenches or recesses in the magnetic recording layer or disk substrate.

Figure 3:
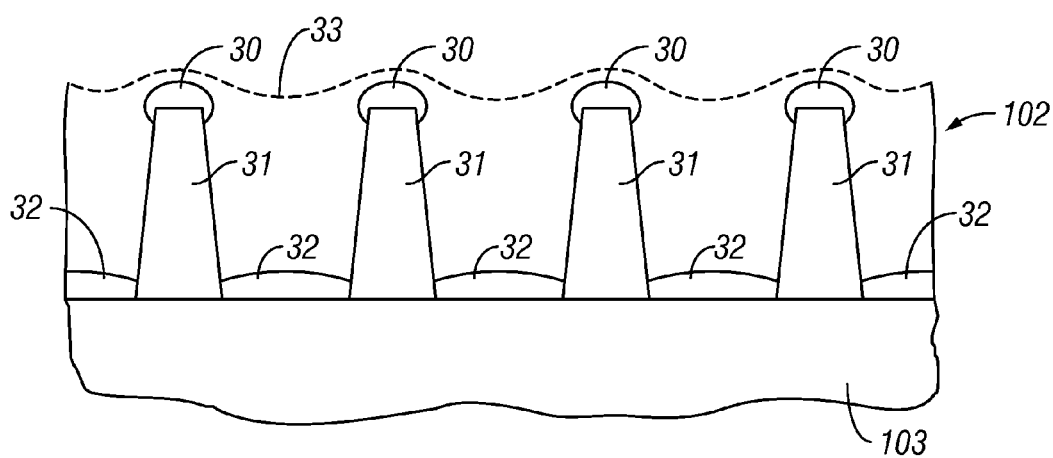
FIG. 3 is a sectional view of a patterned-media disk with data islands as elevated pillars that extend above the disk substrate surface.

Patterned-media disks may be fabricated by any of several known techniques. In one technique a continuous magnetic film is deposited onto a substrate and the film is then ion-beam etched to form the separate data islands. In another type of patterned media, the data islands are elevated, spaced-apart pillars that extend above the disk substrate surface to define recesses or trenches on the substrate surface between the pillars. This type of patterned media is shown in the sectional view in FIG. 3. In this type of patterned media the disk substrate 103 with a pre-etched pattern of pillars 31 and trenches or spaces between the pillars can be produced with relatively low-cost, high volume processes such as lithography and nanoimprinting. The magnetic recording layer material is then deposited over the entire surface of the pre-etched substrate to cover both the ends of the pillars 31 and the spaces between the pillars 31, resulting in the data islands 30 of magnetic recording layer material and spaces 32 of magnetic recording layer material. The spaces 32 of recording layer material are spaced far enough from the read/write head to not adversely affect reading or writing to the recording layer material in islands 30 and are thus nonmagnetic. The recording layer material in the spaces 32 may also be "poisoned" with a dopant material, for example silicon, so that the recording layer material in the spaces 32 is rendered nonmagnetic. This type of patterned media is described by Moritz et al., "Patterned Media Made From Pre-Etched Wafers: A Promising Route Toward Ultrahigh-Density Magnetic Recording", *IEEE Transactions on Magnetics*, Vol. 38, No. 4, July 2002, pp. 1731-1736; and by Bandic et al., "Patterned magnetic media: impact of nanoscale patterning on hard disk drives", *Solid State Technology S7+Suppl. S*, September 2006. The patterned-media disk shown in FIG. 3 may also be "planarized", as illustrated by dashed line 33, by covering the disk with planarizing material that fills the spaces 32. U.S. Pat. No. 6,680,079 B2 describes a method of planarizing a disk that has topographic features by applying a perfluorinated polyether (PFPE) polymer with a functional acrylate end group, and then curing the polymer.

The writing on patterned-media disks, i.e., the magnetization of the magnetizable material in the data islands by the disk drive write head, requires the synchronization of the write pulses from the write head with the pattern of data islands. A patterned-media magnetic recording disk drive that uses a magnetoresistive, capacitive or thermal sensor to detect magnetized data islands and provide a signal to clock the writing is described in U.S. Pat. No. 6,754,017 B2, assigned to the same assignee as this application.

Figure 4:
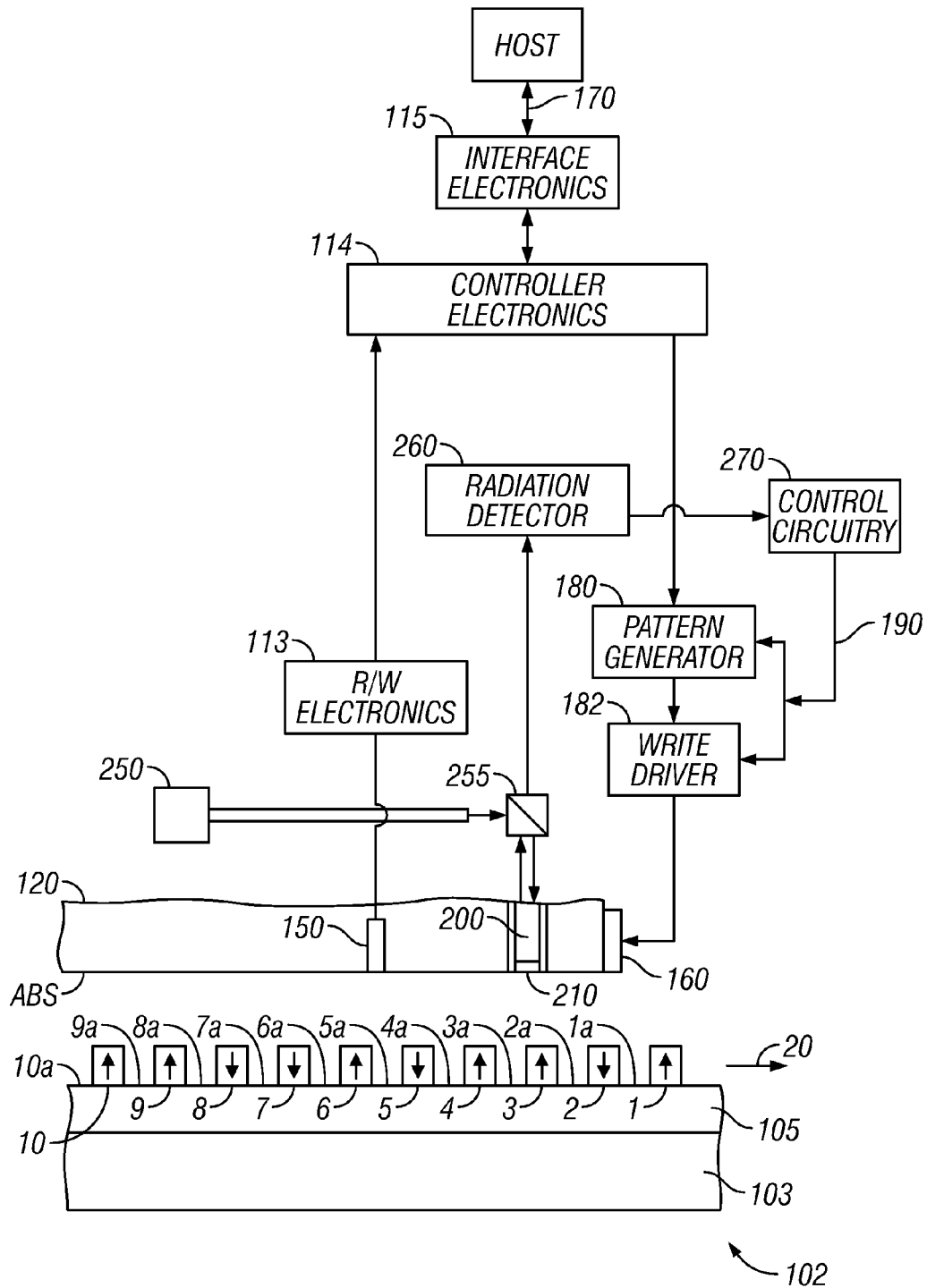
FIG. 4 is a schematic illustrating the general features and operation of an embodiment of the invention.

FIG. 4 is a schematic illustrating the general features and operation of an embodiment of the invention. FIG. 4, which is not drawn to scale because of the difficulty in showing the very small features, shows a sectional view of the patterned-media magnetic recording disk 102 with a data track having discrete magnetizable data islands 1-10 separated by nonmagnetic spaces 1a-10a. The arrows depicted in the islands 1-10 represent the magnetic moments or magnetization directions in the islands, and are depicted for perpendicular or out-of-plane magnetic recording. Thus the disk 102 includes a disk substrate 103 and an optional "soft" or relatively low-coercivity magnetically permeable underlayer (SUL) 105 below the data islands. The SUL 105 is typically any alloy material suitable as the magnetically-permeable flux-return path, such as NiFe, FeAlSi, FeTaN, FeN, CoFeB and CoZrNb. For perpendicular recording, the magnetic material in the data islands 1-10 or on the tops of the data pillars (FIG. 3) may be any media with perpendicular magnetic anisotropy, such as a cobalt-chromium (CoCr) alloy granular layer grown on a special growth-enhancing sublayer, or a multilayer of alternating films of Co with films of platinum (Pt) or palladium (Pd). The disk 102 would also typically include a protective overcoat (not shown) over the data islands 1-10.

The air-bearing slider 120 is depicted in sectional view above disk 102 and is shown with the read head 150 and the write head 160. The read head 150 and write head 160 are formed on the trailing end of slider 120. The recording or writing of data occurs by an inductive coil write head 160 that has a write pole that generates a magnetic field to magnetize the islands in one of the two magnetization directions, depending on the direction of current through the coil of the write head. Because the spaces 1a-10a between the islands are nonmagnetic, the write pulses must be precisely timed to magnetize the appropriate islands. While FIG. 4 illustrates perpendicular patterned media, wherein the islands 1-10 are depicted with their moments oriented out of the plane of the disk surface, the invention is fully applicable to horizontal or longitudinal patterned media, wherein the islands 1-10 would have their moments oriented parallel to the disk surface.

FIG. 4 also shows schematically the transfer of data between a host system, such as a PC, and the disk drive. The signals from recorded data islands are detected by read head 150, and amplified and decoded by read/write electronics 113. Data is sent to controller electronics 114 and through interface electronics 115 to the host via interface 170. The data to be written to the disk 102 is sent from the host to interface electronics 115 and controller electronics 114 and then as a data queue to pattern generator 180 and then to write driver 182. The write driver 182 generates high-frequency current pulses to the coil of write head 160 which results in the magnetic write fields that magnetize the data islands 1-10. The pattern generator 180 and write driver 182 are controlled by the write clock signal 190.

In this invention, the write clock is synchronized with the location of the data islands so that the write pulses magnetize the desired data islands and only the desired data islands. As shown in FIG. 4, an optical waveguide or channel 200 is located on the slider 120. The optical channel 200 has a near-field transducer structure 210 at the disk-facing surface or air-bearing surface (ABS) of the slider 120. A radiation source 250, such as a diode laser, directs radiation through a beam splitter 255 to optical waveguide 200. The radiation strikes the near-field transducer structure 210 creating concentrated near-field radiation as the disk rotates in the direction 20 past the slider 120. Radiation reflected from the near-field transducer is directed back through the optical waveguide 200 through beam splitter 255 to a radiation detector 260. The reflected optical power depends on whether the near-field transducer structure 210 has interacted with an island or a space between islands. A "near-field" transducer, as used herein, refers to "near-field optics", wherein the passage of light is to, from, through, or near an element with subwavelength features and the light is coupled to a second element located a subwavelength distance from the first. The near-field transducer structure 210 has features less than the wavelength of the radiation from radiation source 250 and the spacing between the near-field transducer structure 210 and the islands and spaces is less that the wavelength of the radiation from the radiation source 250. The output signal from radiation detector 260 represents the difference in reflected light intensity from the near-field transducer-island coupled system and the near-field transducer-space coupled system and is directed to control circuitry 270. The control circuitry 270 generates the write clock signal 190.

Figure 5:
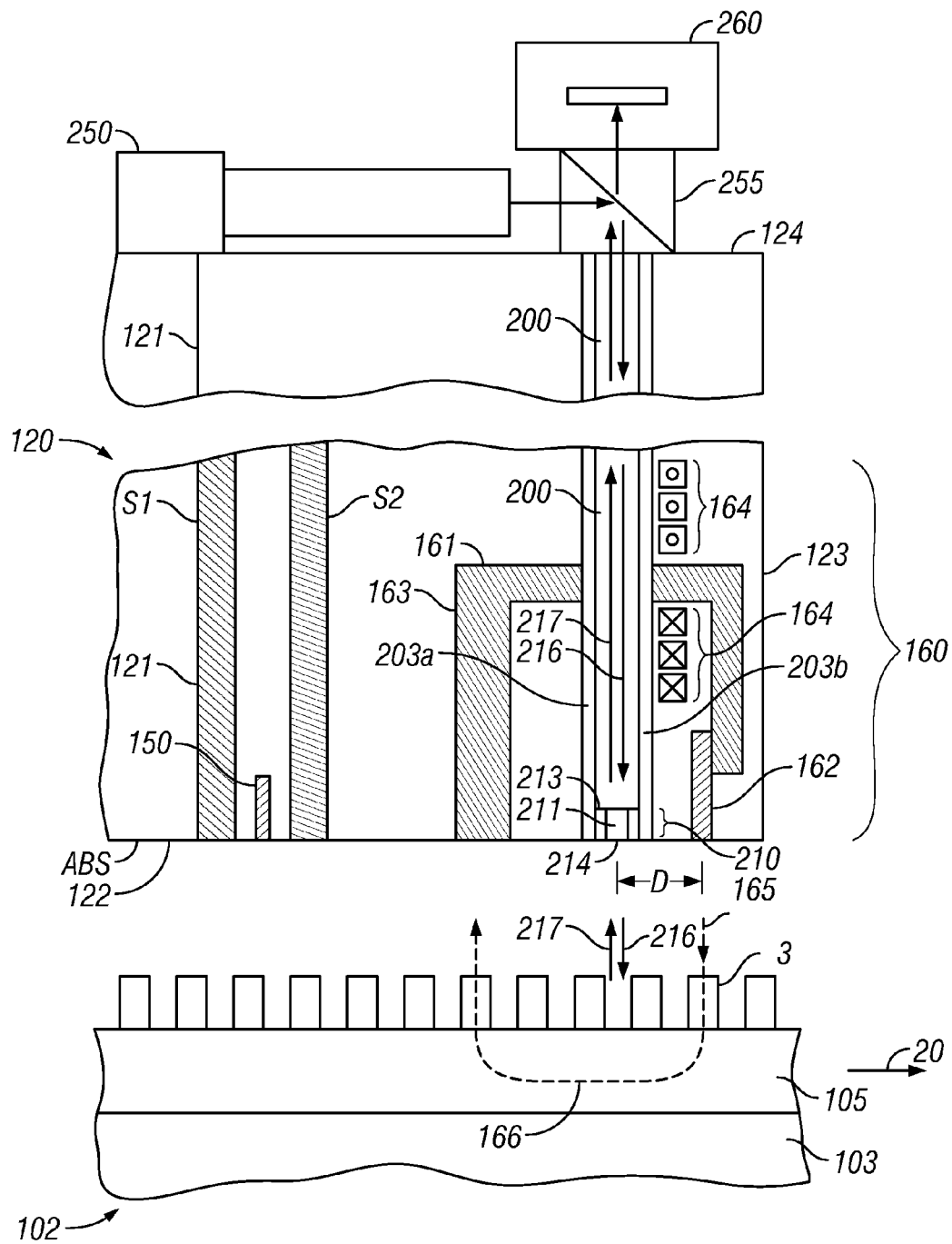
FIG. 5 is a sectional view through a portion of the air-bearing slider and perpendicular magnetic recording disk showing the arrangement of the optical waveguide and write head in an embodiment of the invention.

FIG. 5, which is not drawn to scale because of the difficulty in showing the very small features, is a sectional view through a portion of the air-bearing slider 120 and perpendicular magnetic recording disk 102. The slider 120 has a trailing surface 121 and an air-bearing surface (ABS) surface 122 oriented generally perpendicular to trailing surface 121. The slider 120 is typically formed of a composite material, such as a composite of alumina/titanium-carbide ($Al_2O_3$/TiC), and supports the read and write elements typically formed as a series of thin films and structures on its trailing surface 121. The surface 121 is called the trailing surface because of the direction 20 of the disk 102 relative to slider 120. The ABS 122 is the disk-facing surface of the slider 120 that faces the disk 102 and is shown without the thin protective overcoat typically present in an actual slider. The disk-facing surface or ABS shall mean the surface of the slider that is covered with a thin protective overcoat, the actual outer surface of the slider if there is no overcoat, or the outer surface of the overcoat.

The slider 120 supports a conventional magnetoresistive read head 150 located between shields S1 and S2, and a conventional perpendicular write head 160 that includes a magnetic yoke 161 with a write pole 162, a flux return pole 163, and an electrically conductive coil 164. The write pole 162 is formed of conventional high-moment material, such as a FeCoNi alloy. The write coil 164 is shown as wrapped around yoke 161 with the electrical current directions being shown as into the paper by the coil cross-sections marked with an "X" and out of the paper by the coil cross-sections marked with a solid circle. When write-current pulses are directed through coil 164, the write pole 162 directs magnetic flux to the data islands, as represented by arrow 165 directed to data island 3. The dashed line 166 with arrows shows the flux return path through the disk's SUL 103 back to the return pole 163. As is known in the art, the coil may also be of the helical type.

The slider 120 also includes a waveguide or optical channel 200 with a near-field transducer structure 210 near the ABS 122. The optical waveguide 200 is depicted in FIG. 5 as extending through the yoke 161 and being located between the write pole 162 and the return pole 163. However, the optical waveguide 200 on the trailing surface 121 at other locations, such as between shield S2 and return pole 163, or between the write pole 162 and the outer face 123 of slider 120. The optical waveguide 200 is formed of a core material such as a high-index-of-refraction dielectric material that is transmissive to radiation at the wavelength of the laser radiation source. Typical radiation-transmissive materials include $TiO_2$ and $Ta_2O_5$. The radiation-transmissive material core material is surrounded by cladding material 203a, 203b that has a lower refractive index than the optical waveguide material and is transmissive to radiation at the wavelength of the laser radiation source. Typical cladding materials include $SiO_2$ and $Al_2O_3$. The optical waveguide may have a uniform cross-section along its length or may be in the form of a planar solid-immersion lens or planar solid-immersion mirror, as is known in the art. The optical waveguide 200 directs radiation to the near-field transducer structure 210. The near-field transducer structure 210 may include an opening or aperture 211 that is filled with radiation-transmissive material and that is surrounded by metal layer 212, such as a layer of Cu, Au, Ag, or Al. Preferably the aperture 211 is filled with a low index of refraction material such as $SiO_2$ or $Al_2O_3$. Alternatively the near-field transducer may include a vertical or horizontal antenna structure (not shown) instead of an aperture, as is known in the art The near-field transducer structure 210 typically has a radiation entrance face 213 for radiation from the source and a radiation exit face 214 that are generally parallel to one another and to the ABS 122. The near-field transducer structure 210 directs near-field radiation, as represented by arrow 216, to the data islands and spaces as the disk 102 moves in the direction 20 relative to the slider 120. The near-field radiation interacts with the data islands and changes the optical power reflected back through the optical waveguide 200, as represented by arrow 217. The distance "D" in FIG. 5 is the physical spacing or offset in the along-the-track direction between the aperture 211 and the write pole 162.

The present invention is applicable to magnetic recording systems that do not use heat to assist in the recording of data. Heat-assisted recording, also called thermally-assisted recording (TAR), has been proposed. In TAR systems, an optical waveguide with a near-field transducer directs heat from a radiation source, such as a laser, to heat localized regions of the magnetic recording layer on the disk. The radiation heats the magnetic material locally to near or above its Curie temperature to lower the coercivity enough for writing to occur by the write head. This type of TAR disk drive is described in U.S. Pat. Nos. 5,583,727 and 6,982,844. The present invention is also fully applicable to patterned-media TAR disk drives and can use the same optical waveguide and near-field transducer that is used for locally heating the disk. However, the primary difference is that a much lower optical power would be required when the present invention is incorporated in non-TAR disk drives. The minimum required optical power will be selected based on the minimum photo-detector signal-to-noise ratio (SNR) that enables an island versus space detection.

As shown in FIG. 5, the radiation source 250, beam splitter 255, and radiation detector 260 may be located on the top surface 124 of slider 120. Alternatively, these optical elements may be located on the actuator arm 131 or suspension 135 (FIG. 1) or at other locations in the disk drive, with the radiation directed from the diode laser through an optical fiber or waveguide, and the reflected radiation transmitted back through an optical fiber or waveguide to the radiation detector. The radiation source 250 may be a laser diode, for example a CD-RW type laser diode that provides optical radiation with a wavelength of approximately 780 nm. The radiation detector 260 may be any conventional photodetector, and is preferably a regular or avalanche photodiode. The photodiode may be integrated on a single-chip with an transimpedance amplifier that converts current to an amplified voltage.

Figure 6A:
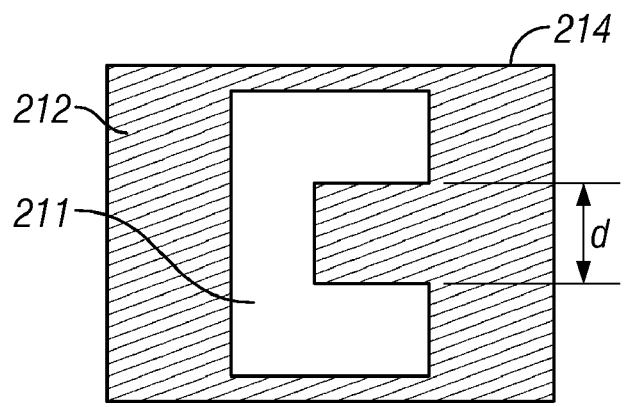
FIG. 6A illustrates a C-shaped aperture with characteristic dimension "d".

Preferably, the aperture 211 at the radiation exit face 214 acts as a near-field optical transducer. The aperture 211 is subwavelength-sized, i.e., the dimension of its smallest feature is less than the wavelength of the incident laser radiation and preferably less than one-half the wavelength of the laser radiation. FIG. 6A is a view of radiation exit face 214 with aperture 211 surrounded by metal layer 212. The aperture 211 shown in FIG. 6A is a "C"-shaped aperture with a characteristic dimension "d". The near-field spot size is determined by the characteristic dimension "d", which is the width of the ridge of the aperture. The resonant wavelength depends on the characteristic dimension of the aperture as well as the electrical properties and thickness of the thin film surrounding the aperture. This is discussed by J. A. Matteo et al., *Applied Physics Letters*, Volume 85(4), pp. 648-650 (2004) for a C-shaped aperture.

Figure 6B:
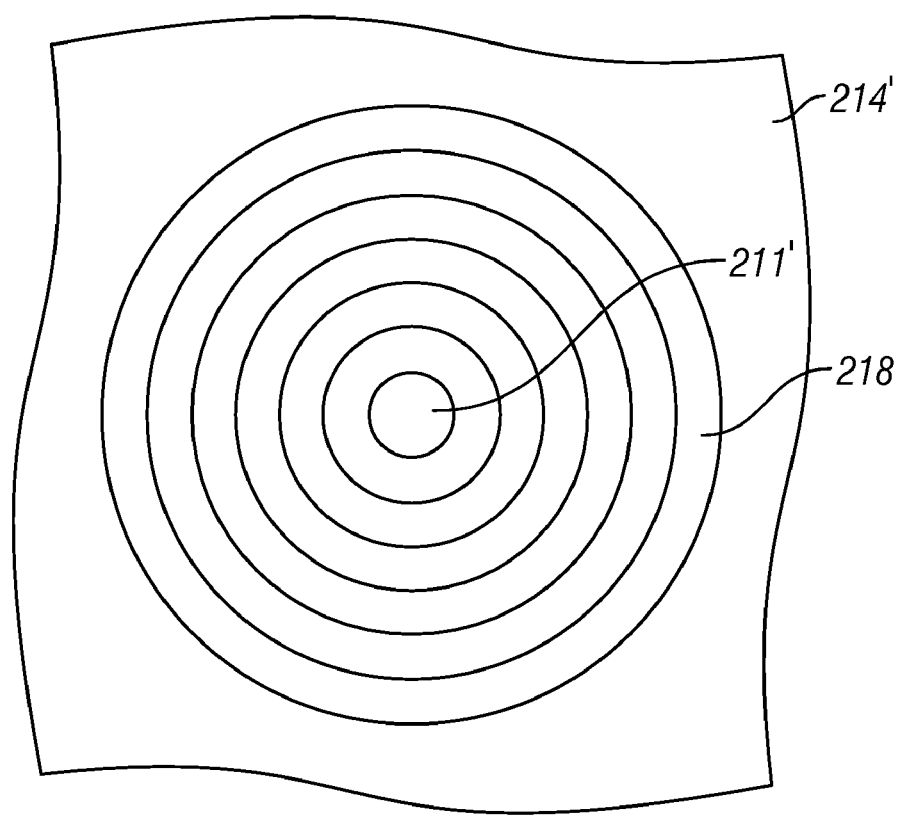
FIG. 6B is a view of the output side of a circular aperture and shows a metal film that forms the exit face and has a periodic corrugation or ridge surface structure.

FIG. 6B is a view of the output side of a circular aperture 211' as seen from the disk and shows a modification wherein the metal film that forms the exit face 214' and surrounds the aperture 211' has a periodic corrugation or ridge surface structure, as depicted by the concentric circular pattern 218. It is known that optical transmission through a subwavelength aperture in a metal film is enhanced when the incident radiation is resonant with surface plasmons at a corrugated metal surface surrounding the aperture. Thus features such as ridges or trenches in the metal film serve as a resonant structure to further increase the emitted radiation output from the aperture beyond what it would be in the absence of these features. The effect is a frequency-specific resonant enhancement of the radiation emitted from the aperture, which is then directed onto the recording layer, with the recording layer being positioned within the near-field. This resonant enhancement is described by Thio et al., "Enhanced light transmission through a single subwavelength aperture", *Optics Letters*, Vol. 26, Issue 24, pp. 1972-1974 (2001); and in U.S. Pat. No. 6,975,580.

Figure 6C:
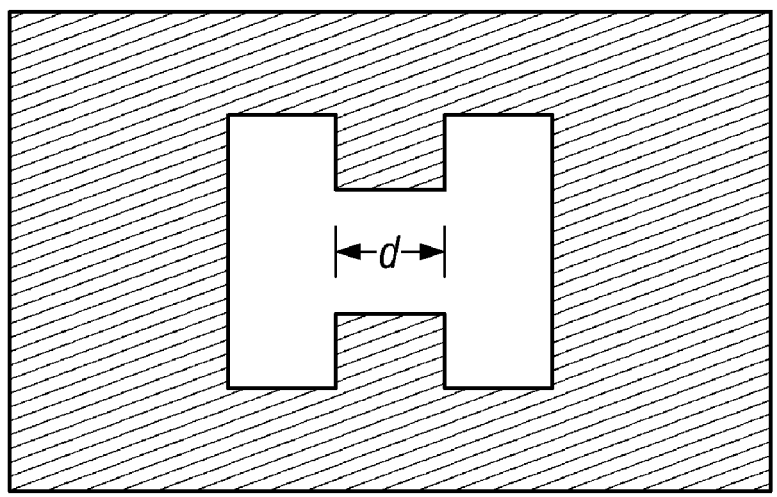
FIG. 6C illustrates an H-shaped aperture with characteristic dimension "d".
Figure 6D:
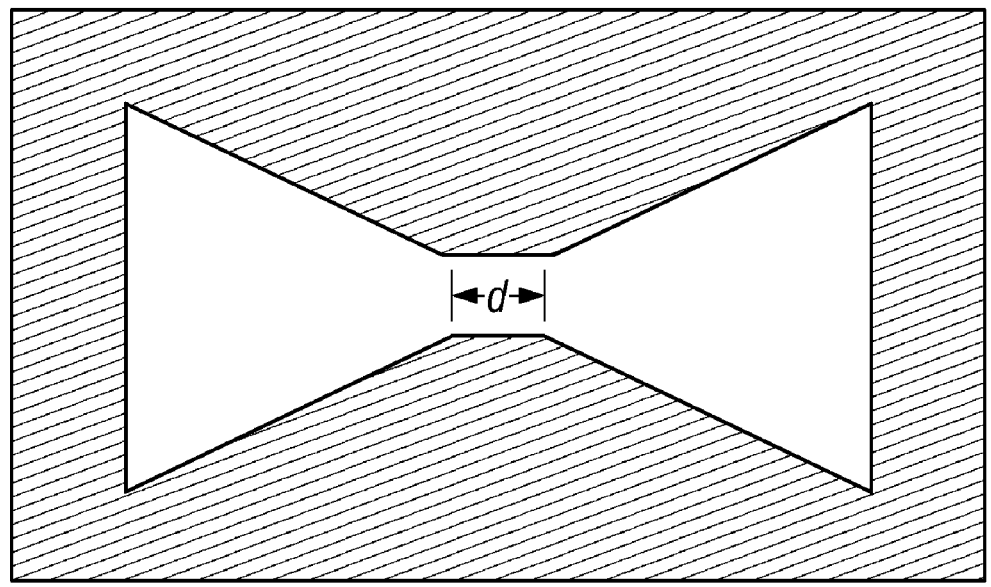
FIG. 6D illustrates a bowtie-shaped aperture with characteristic dimension "d".

FIGS. 6C-6D illustrate other shapes for the aperture, in particular, an H-shaped aperture (FIG. 6C) and a bowtie-shaped aperture (FIG. 6D), each of which has its own characteristic dimension "d". The characteristic dimension "d" is in the range of 5 to 100 nm and is selected based on the size of the islands and the wavelength and intensity of the radiation, and spans part of an island or an entire island or multiple islands in the cross-track direction. The surface plasmon resonant excitation around these types of apertures enhances the radiation transmission.

Figure 7:
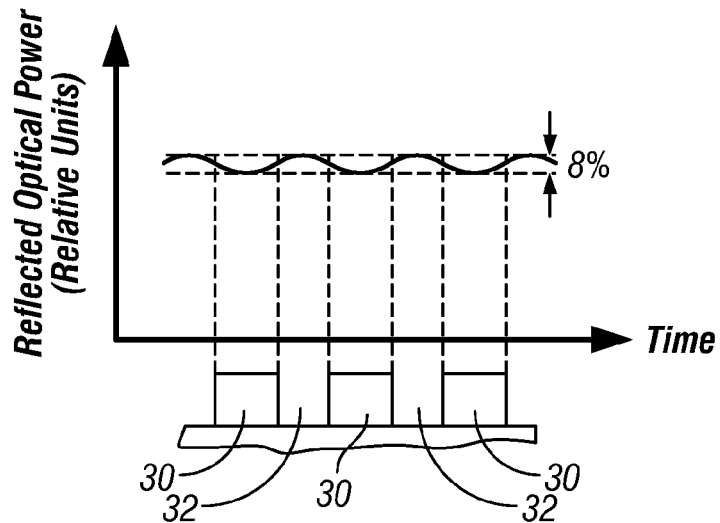
FIG. 7 is a schematic depicting the results of a computer simulation of optical power (in relative units) reflected from the near-field transducer as a function of time as the islands and spaces move past the near-field transducer.

FIG. 7 is a graph of optical power (in relative units) reflected from the near-field transducer as a function of time as the islands 30 and spaces 32 move past the near-field transducer as the disk moves past the aperture 211, and represents the input to radiation detector 260 as a function of time. The schematic of FIG. 7 incorporates the results of a computer-modeled simulation where the islands are pillars with their tops spaced from the near-field transducer by 8 nm and the spaces are recesses spaced from the near-field transducer by 40 nm. The reflected power from a space is about 8% higher than the reflected power from an island. The radiation detector 260, which is preferably a photodiode, thus provides an output signal that represents this variation in reflected optical power as the disk rotates and the islands and spaces move past the aperture 211 of the optical waveguide 200.

Figure 8:
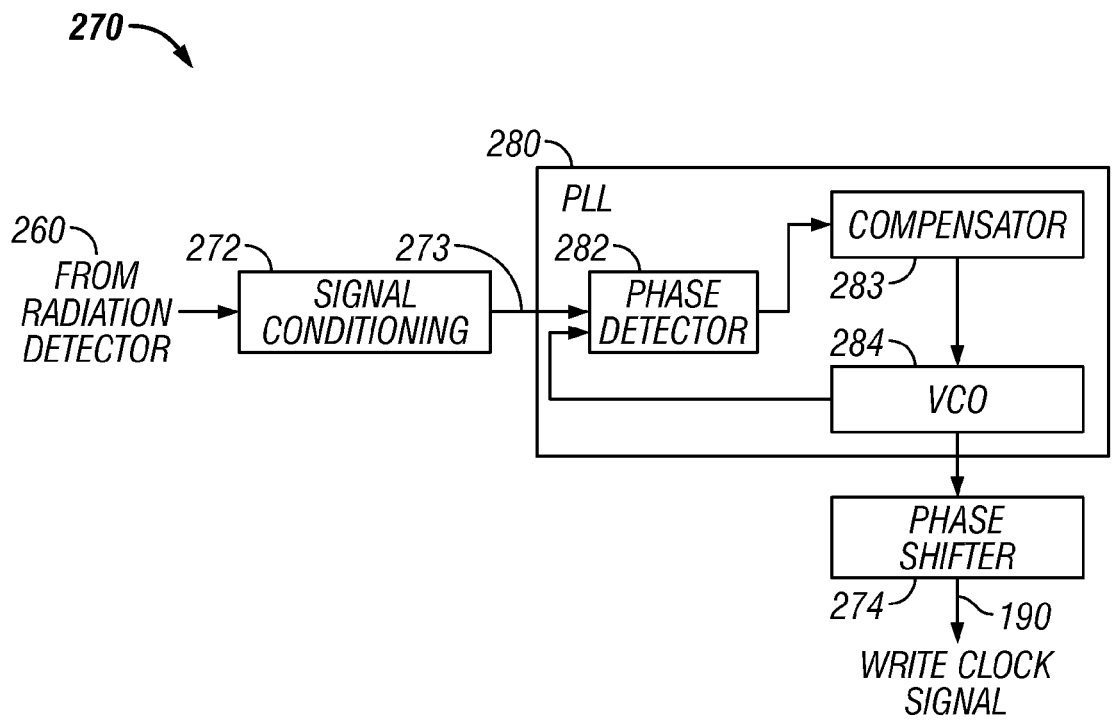
FIG. 8 is a block diagram of control circuitry that receives an analog voltage signal from radiation detector and provides a control signal to the write clock according to an embodiment of the invention.

FIG. 8 is a block diagram of control circuitry 270 that receives an analog voltage signal from radiation detector 260 and provides the write clock signal 190. The control circuitry 270 includes signal conditioning circuitry 272, a phase-locked-loop (PLL) 280 and a phase shifter 274. The voltage signal from radiation detector 260 is passed to signal conditioning circuitry 272 where it is processed by filtering and/or amplification or other process required to make it suitable for input to PLL 280. The signal conditioning circuitry 272 takes the analog signal from the detector 260, which is likely to be a series of rounded pulses (perhaps quasi-sinusoidal) and some included noise. The ideal input to the phase detector 282 is a square wave, although a clean periodic wave of any type is usable. Frequencies other than the fundamental period of the radiation detector signal (corresponding to the frequency of passage of islands under the detector) and its harmonics are generally harmful noise and can be filtered out to improve signal quality going into the phase detector 282. A threshold or peak detector can also be used to trigger the generation of a clean square wave suitable for the phase detector 282. As is known in the art, the signal conditioning depends on the original shape of the signal from the radiation detector 260 as well as noise components, amplitude, DC offset, etc. The signal conditioning circuitry 272 provides an input reference signal 273 to the PLL 280 and phase shifter 274, which generate a write clock signal 190 that matches the frequency of the reference signal 273 and has a specified phase offset with respect to the reference signal 273. The phase offset is adjustable via phase shifter 274. The PLL 280 includes phase detector 282, voltage-controlled-oscillator (VCO) 284, and compensator 283. The PLL 280 responds to both the frequency and the phase of the input reference signal 273 from signal conditioning circuitry 272, automatically raising or lowering the frequency of VCO 284 until it is matched to the reference signal 273 frequency and phase. The compensator 280 is the feedback loop within the PLL which appropriately adjusts the frequency of the VCO 284 to minimize the error at the phase detector 282.

The control circuitry 270 also includes phase shifter 274. Because the trailing edge of the magnetic field from the write pole 162 (FIG. 5), which controls the final written state of the data islands during the write process, does not coincide with the aperture 211, the PLL 280 will not provide instantaneous write synchronization information in real time. There is a physical distance between the write pole 162 and aperture 211 (shown as "D" in FIG. 5), which requires that a fixed phase shift be applied between the signal from signal conditioning circuitry 272 and the write clock signal 190. Thus an appropriate phase shift is applied, using the phase shifter 274, which may be a programmable phase shifter. This type of phase shift function can also be implemented within the PLL 280 itself, by adding an offset to the phase detector 282 output before it is sent to compensator 283. This physical offset between the write pole 162 and aperture 211, which may be hundreds of island widths in magnitude, is one reason it may be desirable to use PLL 280 instead of deriving the write clock directly from the output of signal conditioning circuitry 272. Any variation in the shape or placement of a particular island under the aperture can cause a change in pulse shape or timing, which should not be applied to the synchronization of the write clock which is writing a different island. The effect of the PLL 280 is to average the influence of the signal from the radiation detector 260 over many islands, applying the result to adjust the average phase of the write clock signal 190 over a certain range. The PLL 280 has an averaging effect due to the filter (not shown) that is inside the compensator 283. The reason the PLL 280 performs "averaging" over many islands is because the compensator 283 within the PLL 280 responds slowly compared to the period of islands passing under the radiation detector 260. It is well-known that PLLs are stable when the adjustment of the VCO is done slowly over time, i.e., the response time of the compensator is much longer than one cycle of the VCO. A straightforward example of a suitable compensator 283 for the PLL 280 is an integrator. The phase error of each pulse (cycle) of the reference signal 273 only causes a small change to the integrated output of the integrator, which has been built up over a large number of cycles. The response time of the PLL 280 needs to be fast enough to respond to real mechanical speed changes, for example those due to disk eccentricity and motor cogging, and mechanical vibrations in the system, which are the changes and disturbances that need to be followed so the write clock signal 190 can be adjusted. The response time of the PLL 280 should not be faster than needed because a faster response increases noise in the PLL 280.

The output from radiation detector 260 is a time-dependent voltage output which is generated by a high speed high gain transimpedance amplifier collecting the photocurrent generated by the photodiode or other photodetector assembly. The photodetector gain and bandwidth have to meet the media speed (the speed at which the islands are passing the near-field transducer) and optical channel reflected-power specifications. The operating bandwidth for a disk drive with an areal density of 1 Tbit/in$^2$ and a media speed of 10 m/s is 400 MHz while photocurrents in the order of about 5-10 femto-A/sqrt(Hz) will require a gain of $10^9$ V/A or more for processing signals in the range of 1-10 mV peak-to-peak. These values may require a photodetector with small capacitance and high quantum efficiency at the desired operating wavelength. The subsequent processing of the signal from the photodetector will involve a voltage threshold detector which enables the conversion of the photodetected signal to a square wave representing the high and low reflectivity areas corresponding to island and spaces, respectively.

The write synchronization system and method as described above and illustrated with various island diagrams may be implemented in conventional analog or digital hardware components or in software. The servo control processor, or other microprocessor in the disk drive, may perform the method, or portions of the method, using algorithms implemented in computer programs stored in memory accessible to the processor.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A thermally assisted recording (TAR) patterned-media magnetic recording disk drive comprising:
   a rotatable magnetic recording disk having a plurality of data tracks, each data track patterned into discrete magnetizable data islands separated by nonmagnetic spaces;
   a radiation source for directing radiation to the islands and spaces as the disk rotates, the radiation source heating the magnetizable data islands to near or above the Curie temperature of the data islands;
   a radiation detector for detection of reflected radiation and providing an output signal that varies in response to whether the radiation is directed to an island or a space;
   a write head for generating write pulses to magnetize the heated data islands as the disk rotates; and
   a write clock responsive to the radiation detector output signal and coupled to the write head for controlling the write pulses generated by the write head.

2. The disk drive of claim 1 further comprising an optical waveguide and a near-field transducer for the transmission of radiation from the radiation source to the islands and spaces, the optical waveguide directing radiation to the near-field transducer, wherein the radiation detector detects radiation reflected from the near-field transducer, and wherein the reflected radiation is modulated by the presence of an island under the transducer.

3. The disk drive of claim 2 wherein the near-field transducer is an aperture and has a shape selected from the group consisting of a C-shape, an H-shape and a bowtie shape.

4. The disk drive of claim 2 wherein the near-field transducer is formed of a material selected from the group consisting of Cu, Au, Ag, and Al and wherein the near-field transducer has a characteristic dimension less than the wavelength of the radiation.

5. The disk drive of claim 4 wherein said near-field transducer comprises a metallic film having periodic corrugations.

6. The disk drive of claim 2 further comprising a head carrier for supporting the write head near the disk, and wherein the optical waveguide and near-field transducer are located on the head carrier.

7. The disk drive of claim 6 wherein the radiation source comprises a laser diode on the head carrier.

8. The disk drive of claim 1 wherein the write clock comprises a phase-locked-loop (PLL) having a phase detector and a voltage-controlled-oscillator (VCO), the phase detector being responsive to the radiation detector output signal and the VCO generating a write clock signal.

9. The disk drive of claim 8 further comprising a phase shifter coupled to the VCO for providing a phase offset between the radiation detector output signal and the write clock signal.

10. The disk drive of claim 1 wherein the islands comprise pillars and the spaces comprise recesses and wherein the radiation detector output signal is representative of a difference in intensity between radiation reflected from the near-field transducer with a pillar under the transducer and radiation reflected from near-field transducer with a recess under the transducer.

11. The disk drive of claim 1 wherein the data islands are perpendicularly magnetizable and wherein the write head comprises a perpendicular write head.

12. A thermally assisted recording (TAR) perpendicular magnetic recording disk drive comprising:
 a rotatable patterned-media perpendicular magnetic recording disk comprising a substrate, a plurality of discrete pillars patterned on the substrate and separated by recesses, the pillars containing perpendicularly magnetizable magnetic recording material and arranged in generally circular data tracks;
 a head carrier having a disk-facing surface;
 an optical channel and near-field transducer coupled to the optical channel for the transmission of radiation to the pillars and recesses, the optical channel and near-field transducer being located on the head carrier, the near-field transducer having a radiation exit face located substantially at the disk-facing surface and the spacing between the pillars and the exit face being less than the wavelength of the radiation;
 a radiation source for directing radiation through the optical channel and near-field transducer to the pillars and recesses as the disk rotates, the radiation source heating the magnetic recording material of the pillars to near or above the Curie temperature of the magnetic recording material;
 a radiation detector providing an output signal in response to detection of radiation reflected from the near-field transducer and through the optical channel, the radiation detector output signal being representative of variations in reflected radiation as pillars and recesses pass the radiation exit face as the disk rotates;
 a perpendicular recording write head comprising an electrically conductive coil and a write pole, the coil generating write pulses to cause the write pole to magnetize the pillars while the magnetic recording material of the pillars is near or above the Curie temperature as the disk rotates; and
 write clock control circuitry responsive to the radiation detector output signal and coupled to the write head for generating a write clock signal for controlling the write pulses generated by the coil.

13. The disk drive of claim 12 wherein the near-field transducer is an aperture and has a shape selected from the group consisting of a C-shape, an H-shape and a bowtie shape.

14. The disk drive of claim 12 wherein the near-field transducer is formed of a metal selected from the group consisting of Cu, Au, Ag and Al, and has a characteristic dimension less than the wavelength of the radiation.

15. The disk drive of claim 12 wherein the near-field transducer comprises a metallic film having periodic corrugations.

16. The disk drive of claim 12 wherein the radiation source comprises a laser diode on the head carrier.

17. The disk drive of claim 12 wherein the radiation detector is a photodiode.

18. The disk drive of claim 12 wherein the write clock control circuitry comprises a phase-locked-loop (PLL) having a phase detector and voltage-controlled-oscillator (VCO, the phase detector being responsive to the radiation detector output signal and the write clock generating the write clock signal.

19. The disk drive of claim 18 further comprising a phase shifter coupled to the VCO for providing a phase offset between the radiation detector output signal and the write clock signal.

20. The disk drive of claim 12 wherein the near-field transducer and the write pole are physically offset from each other on the head carrier, and further comprising means for adjusting the write clock signal by a value representative of said offset.

* * * * *